(12) United States Patent
Hetrick et al.

(10) Patent No.: US 11,460,170 B2
(45) Date of Patent: *Oct. 4, 2022

(54) LUMINAIRE WITH ELECTROCHROMIC FILM REFLECTOR

(71) Applicant: SIGNIFY HOLDING B.V., Eindhoven (NL)

(72) Inventors: Westly Hetrick, Atlanta, GA (US); William E. Getzinger, Golden, CO (US); Chris M Clary, Broomfield, CO (US); Alexander James Ross, Aurora, CO (US); Melisa Altamirano-Ruelas, Lakewood, CO (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/214,012

(22) Filed: Mar. 26, 2021

(65) Prior Publication Data

US 2021/0215320 A1  Jul. 15, 2021

Related U.S. Application Data

(63) Continuation of application No. 16/664,632, filed on Oct. 25, 2019, now Pat. No. 10,962,201.

(51) Int. Cl.
*F21V 14/00* (2018.01)
*F21V 8/00* (2006.01)
(Continued)

(52) U.S. Cl.
CPC .............. *F21V 14/003* (2013.01); *F21S 8/06* (2013.01); *G02B 6/005* (2013.01); *G02B 6/0088* (2013.01); *G02F 1/163* (2013.01); *F21Y 2115/10* (2016.08)

(58) Field of Classification Search
CPC ................................ F21S 8/06; F21V 14/003
See application file for complete search history.

(56) References Cited

U.S. PATENT DOCUMENTS

| 10,598,984 B2 | 3/2020 | Shi |
| 2003/0169512 A1 | 9/2003 | Bourdelais et al. |

(Continued)

FOREIGN PATENT DOCUMENTS

| CN | 104235717 A | 12/2014 |
| DE | 10330215 A1 | 1/2005 |

(Continued)

OTHER PUBLICATIONS

Liu et al., "Controllable Electrochromic Polyamide Film and Device Produced by Facile Ultrasonic Spray-coating", Scientific Reports, 7:11982, Sep. 20, 2017.

*Primary Examiner* — Keith G. Delahoussaye

(57) ABSTRACT

A luminaire includes a lightguide panel that is configured to receive light from a light source through an edge thereof and emit light through major surfaces thereof. Further, the luminaire includes an electrochromic film that is disposed on one of the major surfaces of the lightguide panel to adjust an amount of light exiting through the one major surface by controlling an opacity of the electrochromic film. The opacity of the electrochromic film is controlled by controlling an electrical power supplied thereto. In another example, the electrochromic film is disposed on a major surface of a lens that is disposed below and spaced apart from a light source that emits light in a first direction. The opacity of the electrochromic film is controlled by controlling the electrical power supplied thereto to adjust an amount of light that is reflected by the lens to a second direction.

20 Claims, 4 Drawing Sheets

(51) Int. Cl.
  *F21S 8/06* (2006.01)
  *G02F 1/163* (2006.01)
  *F21Y 115/10* (2016.01)

(56) References Cited

U.S. PATENT DOCUMENTS

| | | | |
|---|---|---|---|
| 2014/0376076 A1* | 12/2014 | Chen | F21S 41/645 |
| | | | 359/275 |
| 2015/0219836 A1* | 8/2015 | York | G02B 6/0036 |
| | | | 349/65 |
| 2015/0331246 A1 | 11/2015 | Dewald et al. | |
| 2016/0282543 A1* | 9/2016 | Dau | G02B 6/0096 |
| 2019/0265570 A1 | 8/2019 | Whittingham et al. | |

FOREIGN PATENT DOCUMENTS

| | | |
|---|---|---|
| EP | 2410235 A2 | 1/2012 |
| JP | 2010027586 A | 2/2010 |

* cited by examiner

LUMINAIRE WITH ELECTROCHROMIC FILM REFLECTOR

RELATED APPLICATIONS AND CLAIM OF PRIORITY

The present application is a continuation application of and claims priority to U.S. Nonprovisional patent application Ser. No. 16/664,632, filed Oct. 25, 2019 and titled "Luminaire with Electrochromic Film Reflector," which claims priority to U.S. Provisional Patent Application No. 62/751,216 filed Oct. 26, 2018 and titled "Luminaire with Electrochromic Film Reflector." The entire contents of each of the foregoing applications are hereby incorporated herein by reference.

TECHNICAL FIELD

Embodiments of the present disclosure relate generally to lighting systems, and more particularly to luminaires having electrochromic film reflectors to control light emission and distribution.

BACKGROUND

Conventional light sources, such as incandescent, fluorescent, or HID light sources, are typically omnidirectional, i.e., they emit light in 360 degrees or nearly 360 degrees. Accordingly, when a conventional light source is disposed in a light fixture such as a suspension mounted luminaire, the conventional light source creates both downlight and uplight. However, the lighting industry has been moving towards replacing conventional light sources with light emitting diodes (LEDs) largely due to the efficiency and longer life advantages of the LEDs. One limitation of LEDs is that they are not omnidirectional light sources, i.e., they do not emit light in 360 degrees as the conventional light sources. Instead, LEDs generally emit light in the direction that they are aimed and may fail to create light in an opposite direction, unless a customized housing or a light re-direction device is used to redirect at least a portion of the light from the LEDs towards the opposite direction. As one example, in a suspension mounted luminaire, LEDs that are aimed downwards to create a downlight may fail to create an uplight, unless the suspension mounted luminaire includes a customized housing, light re-direction features, and/or other LEDs that are aimed upwards to create the uplight. The absence of uplight may create an undesirable "cave effect", in which the ceiling and space above the luminaire are dark.

Some example luminaires such as flat panel luminaires having lightguides that are edge-lit using LEDs may be able generate both an uplight and a downlight. However, said flat panel luminaires do not allow an end user to configure, control, and/or vary the amount of uplight. Further, conventional flat panel luminaires may have a high visual mass, i.e., they are more noticeable, which may not be aesthetically pleasing.

Alternatively, in some scenarios, it may be desirable to make the conventional flat panel luminaires more noticeable. For example, when conventional flat panel luminaires comprising transparent or nearly transparent lightguide panels are used to illuminate a pathway, it may be desirable to make the conventional flat panel luminaires more noticeable or visible. In said example, at night, the light emitted by the said luminaires may be visible and may clearly illuminate the pathway. However, during daytime, the luminaires and the light emitted therefrom may be washed away by or not as visible due to sunlight (e.g., particularly in outdoor installations) which may be undesirable.

This background information is provided to reveal information believed to be of possible relevance to the present disclosure. No admission is necessarily intended, nor should be construed, that any of the preceding information constitutes prior art against the present disclosure.

SUMMARY

The present disclosure relates generally to using an electrochromic film in a luminaire. In one example embodiment, a luminaire can comprise: a lightguide panel that is configured to receive light from a light source through a side edge of the lightguide panel and emit the light through a pair of major surfaces of the lightguide panel that are substantially perpendicular to the side edge; and an electrochromic film disposed on a major surface of the pair of major surfaces of the lightguide panel and configured to control an amount of light emitted from the major surface by adjusting an electrical power supplied thereto.

In another example embodiment, a luminaire can comprise: a housing comprising a light emitting opening; a light source that is disposed in the housing and configured to emit light in a first direction; a lens that is disposed in the housing such that the lens is positioned below and spaced apart from the light source, the lens covering the light emitting opening; and an electrochromic film disposed on a major surface of the lens that faces the light source, the electrochromic film configured to control an amount of the light from the light source that is directed to a second direction by adjusting an electrical power supplied to the electrochromic film, the second direction being opposite to the first direction.

These and other example embodiments will be described herein in connection with the drawings.

BRIEF DESCRIPTION OF THE FIGURES

The foregoing and other features and aspects of the present disclosure are best understood with reference to the following description of certain example embodiments, when read in conjunction with the accompanying drawings, wherein.

Figure 1:
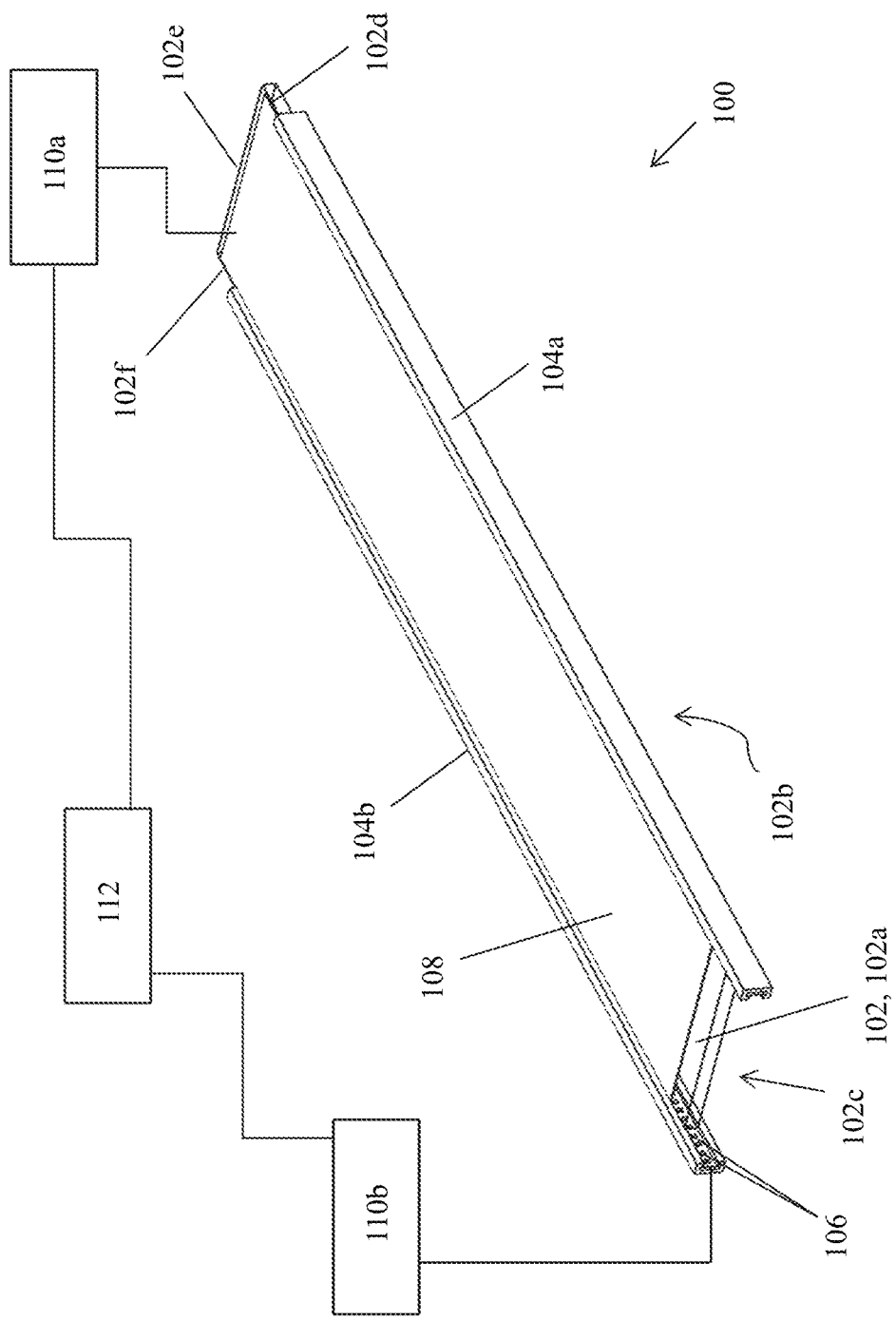
FIG. 1 illustrates an example edge-lit luminaire with an electrochromic film reflector, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, instead emphasis is placed on clearly illustrating the principles of the example embodiments. Additionally, certain dimensions or positions may be exaggerated to help visually convey such principles.

DETAILED DESCRIPTION OF EXAMPLE EMBODIMENTS

The present disclosure describes a luminaire that has an electrochromic film reflector that is configured to provide selective uplight from the luminaire and/or to change a diffusion or distribution of a lens or lightguide panel of a luminaire without having to manually adjust or replace the lens or lightguide panel. An electrochromic film is an optical film having electrochromic properties that allow one or more optical properties of the film, such as color, optical transmission, absorption, reflectance and/or emittance to be controlled in a continual but reversible manner by application of voltage. That is, the electrochromic film can be switched from being opaque to transparent or from being transparent to opaque in a reversible manner when electrical power is applied or removed. In some examples, the electrochromic film can change between being colored and transparent or change between different colors when electrical power is applied or removed. In the present disclosure, this property of electrochromic films is used in luminaires such as flat panel luminaires or on an optical lens to adjust an amount of uplight in the luminaires and/or to control a visibility thereof.

In the following paragraphs, a luminaire with the electrochromic film reflector will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

In particular, example embodiments of the luminaire with the electrochromic film reflector (hereinafter interchangeably referred to as 'electrochromic film') of the present disclosure will be described in association with FIGS. 1-4. Referring to FIG. 1, an example luminaire 100 of the present disclosure includes a lightguide panel 102 that is bound by a first major surface 102*a*, a second major surface 102*b* that is disposed opposite to the first major surface 102*a*, and a plurality of side edges (102*c*-102*f*) that are substantially perpendicular to the two major surfaces (102*a*, 102*b*). In some example embodiments, the lightguide panel 102 may be formed using a plastic optical material such as PMMA acrylic, polystyrene, or optical grade polycarbonate, to mention a few representative examples without limitation. In some example embodiments, the lightguide panel 102 may comprise silicone or another appropriate elastomer. The lightguide panel 102 may be configured to receive light from a light source through at least one of the side edges (102*c*-102*f*) and emit at least a portion of the light through the first major surface 102*a* and/or the second major surface 102*b*. Accordingly, the first major surface 102*a* and the second major surface 102*b* of the lightguide panel 102 may include surface patterns to allow the light to exit therethrough. The surface patterns may include micro optics such as, but not limited to, microetches, microlenses, etc. In some examples, the lightguide panel 102 may include micro-prisms disposed therein to emit light through the major surfaces (102*a*, 102*b*).

The lightguide panel 102 may be configured to propagate the light therethrough by total or partial internal reflection of the light between the first and second major surfaces (102*a*, 102*b*). The light entering the lightguide panel 102 through one side edge of the lightguide panel 102 may be propagated towards an opposite side edge. In some example embodiments, a portion of the light may exit the lightguide panel 102 through the side edges (e.g., side edge opposite to the side from which light from the light source enters the lightguide panel 102), while in other example embodiments, reflective material may be disposed at the side edges to reflect the light reaching the side edges back into the lightguide panel 102. Light that is emitted into the lightguide panel 102 at relatively shallow angles undergoes total internal reflection and proceeds towards one or more of the side edges, while the light at steeper angles is emitted through the major surfaces (102*a*, 102*b*).

In one example embodiment such as the one illustrated in FIG. 1, the lightguide panel 102 may be transparent to reduce a visual mass of the luminaire 100, particularly when the lightguide panel 102 is not propagating light from a light source therethrough. However, in other example embodiments, the lightguide panel may be translucent or opaque while still being able to propagate light from a light source therethrough and emit a portion of the light through the major surfaces.

Further, as illustrated in FIG. 1, the lightguide panel 102 may be disposed and held between a pair of side rails (104*a*, 104*b*) of the example luminaire 100. In particular, the side rails (104*a*, 104*b*) support opposite side edges (102*d*, 102*0* of the lightguide panel 102 as illustrated in FIG. 1. Further, at least one of the side rails (104*a* and/or 104*b*) may house a light source 106 of the example luminaire 100 therein such that light from the light source 106 enters the lightguide panel 102 through the respective side edges (102*d* and/or 102*0* of the lightguide panel 102 that are supported by the side rails (104*a*, 104*b*). As described above, light from the light source 106 that enters the lightguide panel 102 via the side edges (102*d*, 102*0* exits the lightguide through the two major surfaces (102*a*, 102*b*). The light source 106 may be disposed on a substrate such as a circuit board and may include, but is not limited to, light emitting diodes (LEDs), fluorescent tubes, or any other appropriate light source, etc.

Even though the example luminaire 100 illustrated in FIG. 1 is substantially rectilinear in shape, one of skill in the art can understand and appreciate that in other example embodiments, the luminaire can have any other appropriate shape without departing from a broader scope of the present disclosure. For example, the luminaire may have a substantially circular or cylindrical shape, where the lightguide panel 102 and the side rail are similarly substantially circular or cylindrical in shape.

Further, as illustrated in FIG. 1, the example luminaire 100 may include an electrochromic film 108 that is disposed on one of the two major surfaces (102*a* or 102*b*) of the lightguide panel 102. In particular, the electrochromic film 108 may be disposed on the major surface that faces a direction that is opposite to the primary area that is to be illuminated, e.g., first major surface 102*a* that faces a ceiling when the luminaire 100 is suspension mounted. The electrochromic film 108 may be disposed on the major surface (102*a* or 102*b*) of the lightguide panel 102 using adhesives or any appropriate coupling or attachment without departing from a broader scope of the present disclosure.

In one example embodiment, the electrochromic film 108 may be configured to transition from being opaque when power is applied to the electrochromic film 108 to being transparent when power is removed from the electrochromic film 108, or vice-versa. In said example embodiment, the opacity of the electrochromic film 108 can be varied with the amount of power applied to the electrochromic film 108. That is, the opacity of the electrochromic film can be dynamically controlled based on the amount of power (or changing the voltage) applied to the electrochromic film 108.

In another example embodiment, the electrochromic film 108 may be configured to transition from being colored when power is applied to the electrochromic film 108 to being transparent when power is removed from the electrochromic film 108, or transition between different colors when power is applied to the electrochromic film 108 to being transparent when power is removed from the electrochromic film 108, or vice-versa. The electrochromic film 108 may transition between different colors based on the amount of power (or voltage) applied to the electrochromic film 108. Alternatively, the electrochromic film 108 may be configured to transition from a first color when electrical power is applied thereto to a second color when the electrical power is removed therefrom.

As illustrated in FIG. 1, the power supplied to the light source 106 and the electrochromic film 108 may be independently controlled. That is, the power supplied to the electrochromic film 108 may be controlled by a first power control device 110a and the power supplied to the light source 106 may be controlled by a second power control device 110b that is independent of the first power control device 110a. The first and second power control devices (110a, 110b) may include, but are not limited to, voltage regulators, or any other appropriate devices that can control the voltage and/or the amount of electrical power supplied to the electrochromic film and light source.

Further, the power control devices (110a and/or 110b) may be coupled to a controller device 112. The controller device 112 may include, but is not limited to, a microcontroller, a microprocessor, a field programmable gate array (FPGA), or any other appropriate device that can receive data and generate control instructions for the power control devices (110a, 110b). The controller device 112 may include a communication module, e.g., a wireless communication module that allows a user to establish wireless communication with the controller device 112 via a computing device of the user or via a control switch (wall switch). In some example embodiments, the controller device 112 may also be communicably coupled to a switch (e.g., a wall switch) via a wired connection. In either case, the controller device 112 may be configured to receive instructions (data) from a user and responsively generate control data for transmission to the power control devices (110a, 110b) to control the electrical power supplied to the electrochromic film 108 and the light source 106. In other words, if the controller device 112 has a wireless communication module, a user may electronically and wirelessly control the uplight, downlight, light distribution, etc., from the luminaire 100 by controlling the electrochromic film 108 (e.g., opaqueness, color, etc., thereof) from a remote location.

In one example embodiment, the power to the light source 106 and the electrochromic film 108 disposed on the lightguide panel 102 may be independently controlled by the first and second power control devices (110a, 110b) such that: (a) when the light source 106 is switched on, power is supplied to the electrochromic film 108 to make the electrochromic film 108 opaque; and (b) when the light source 106 is switched off, power to the electrochromic film 108 is turned off to make the electrochromic film 108 transparent. When the light source is switched off, the transparent lightguide panel 102 may provide a low visual mass (i.e., it is less noticeable) and may be more aesthetically pleasing. Conventional flat panel luminaires use dedicated reflector panels, e.g., metal, plastic, or paper sheets, that are disposed on the major surface of the lightguide panel facing the ceiling. Such dedicated reflector panels do not allow any uplight to pass therethrough and further, they increase a visual mass of the luminaire because they are not transparent when the light source 106 is switched off. When the light source 106 is turned on, the opacity of the electrochromic film 108 may be controlled or adjusted based on the amount of uplight and downlight that is desired by the end user. For example, if no uplight is desired, then, the electrochromic film 108 may be made opaque to a maximum possible level. The opaque electrochromic film 108 may reflect substantially all the light exiting the lightguide panel 102 through the first major surface 102a back into the lightguide panel 102 to exit as downlight towards an area to be illuminated (e.g., through the second major surface 102b). However, if some uplight is desired, then, the opacity of the electrochromic film 108 may be adjusted by adjusting the power supplied to the electrochromic film 108 such that a portion of the light exiting the lightguide panel 102 through the first major surface 102a may be allowed to pass through the electrochromic film 108 to create an uplight, while a remainder of the light exiting through the first major surface 102b may be reflected back into the lightguide panel 102 to exit as downlight.

By controlling the amount of power supplied to the electrochromic film 108, a user may be able to dynamically adjust the opacity of the electrochromic film 108 and thereby dynamically adjust the amount of uplight produced by the luminaire 100. That is, the amount of uplight provided by the luminaire 100 may be adjusted along a gradient or continuum from a minimum amount of uplight to a maximum amount of uplight, where in one example, the minimum amount of uplight may be 0% of the amount of light from the light source 106 that enters the lightguide panel 102 and a maximum amount of uplight may be 50% of the amount of light from the light source 106 that enters the lightguide panel 102 (the other 50% may exit as downlight) (assuming no other light loss). In other example embodiments, the lightguide panel 102 may be designed to allow more than 50% of the amount of light from the light source 106 that enters the lightguide panel 102 to exit the lightguide panel 102 as uplight. In some example embodiments, the power to the light source 106 and the electrochromic film 108 may be controlled such that when the light source 106 is switched on, the power supply to the electrochromic film 108 may be turned off to make the electrochromic film 108 transparent and thereby create a maximum amount of uplight while also providing downlight.

Even though the present disclosure describes that the power to the light source 106 and the electrochromic film 108 are controlled such that: when the light source 106 is switched on, the electrochromic film 108 is made opaque; and when the light source 106 is switched off, the electrochromic film is made transparent, one of skill in the art can understand and appreciate that in other example embodiments, the electrochromic film 108 may be made transparent when the light source is switched on, and the electrochromic film 108 may be made opaque when the light source is switched off without departing from a broader scope of the present disclosure. Further, in some example embodiments, the power to the light source 106 and the electrochromic film 108 may be controlled jointly by one power control device instead of being controlled independently using different power control devices (110a, 110b).

Further, even though the present disclosure describes one electrochromic film being disposed on the lightguide panel, one of skill in the art can understand and appreciate that in other example embodiments of the present disclosure, more than one electrochromic film may be disposed on the lightguide panel without departing from a broader scope of the present disclosure. For example, the luminaire may include one electrochromic film disposed on the first major surface of the lightguide panel and another electrochromic film disposed on the second major surface. In said example, the first electrochromic film may be configured to operate as described above, while the second electrochromic film may be configured to transition between different colors when power is applied and be transparent when power is removed. Further, in said example, the second electrochromic film may be substantially shaped like an arrow such that during an emergency, power may be applied to the second electrochromic film to form a colored (e.g., red or green) arrow to indicate an escape path or path to the nearest exit. In said example, the first and second electrochromic film may be independently controlled.

Furthermore, even though the present disclosure describes the electrochromic film being disposed on a lightguide panel in a flat panel luminaire, one of skill in the art can understand and appreciate that in other example embodiments, the electrochromic film may be disposed on any other appropriate element of any other appropriate luminaire to provide selective uplight without departing from a broader scope of the present disclosure. For example, the electrochromic film may be disposed on a plastic reflector in a drum light fixture. The drum light fixture may be suspension mounted and may include a light source and a plastic reflector disposed above the light source. The plastic reflector may be clear and may have an electrochromic film disposed thereon. Power supplied to the electrochromic film disposed on the plastic reflector may be adjusted to control the amount of uplight in the drum light fixture.

Additionally, even though the present disclosure describes the lightguide panel with the electrochromic film reflector 108 as being used in an edge-lit flat panel luminaire, one of skill in the art can understand and appreciate that the electrochromic film may be used with any other type of luminaire without departing from a broader scope of the present disclosure. For example, as illustrated in FIGS. 2-3, an electrochromic film may be used in a back-lit luminaire 200.

Figure 2:
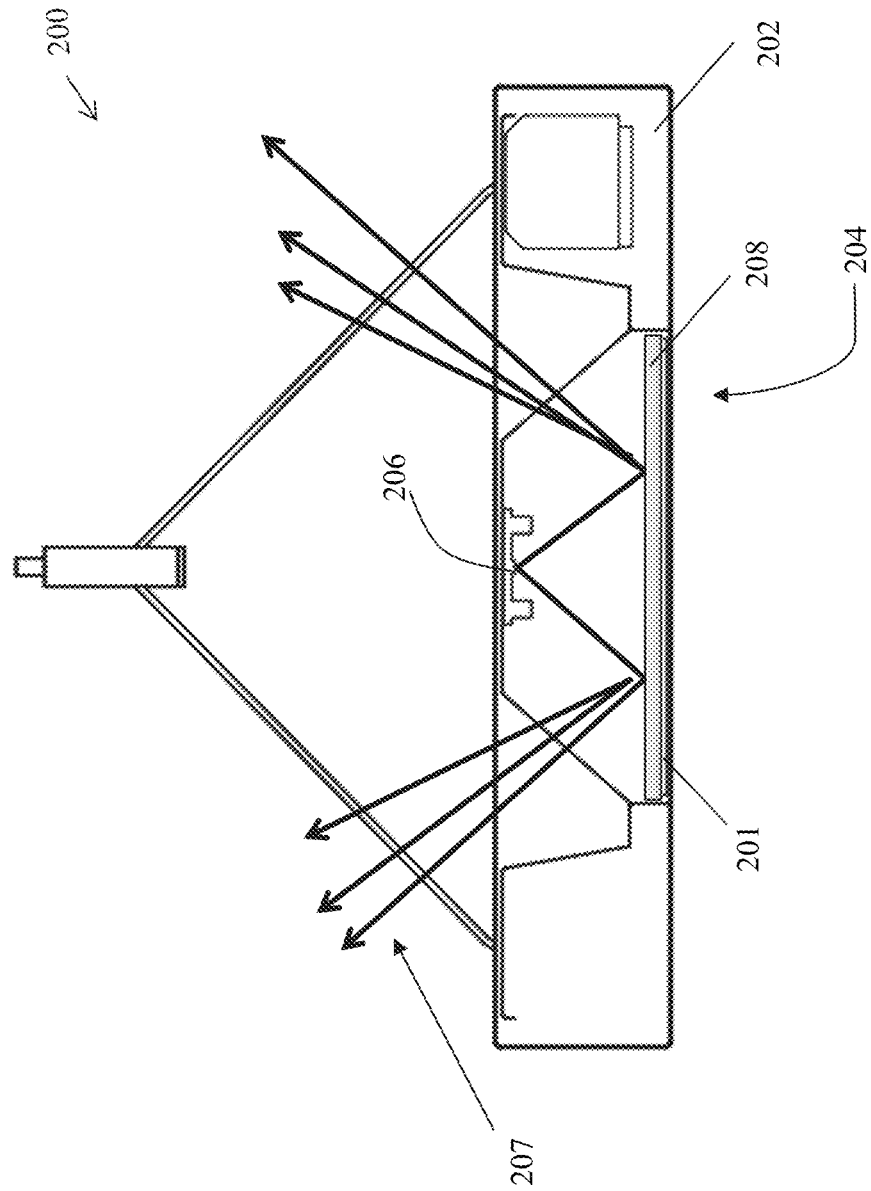
FIGS. 2-3 illustrate an example back-lit luminaire with an electrochromic film reflector, in accordance with example embodiments of the present disclosure.
Figure 3:
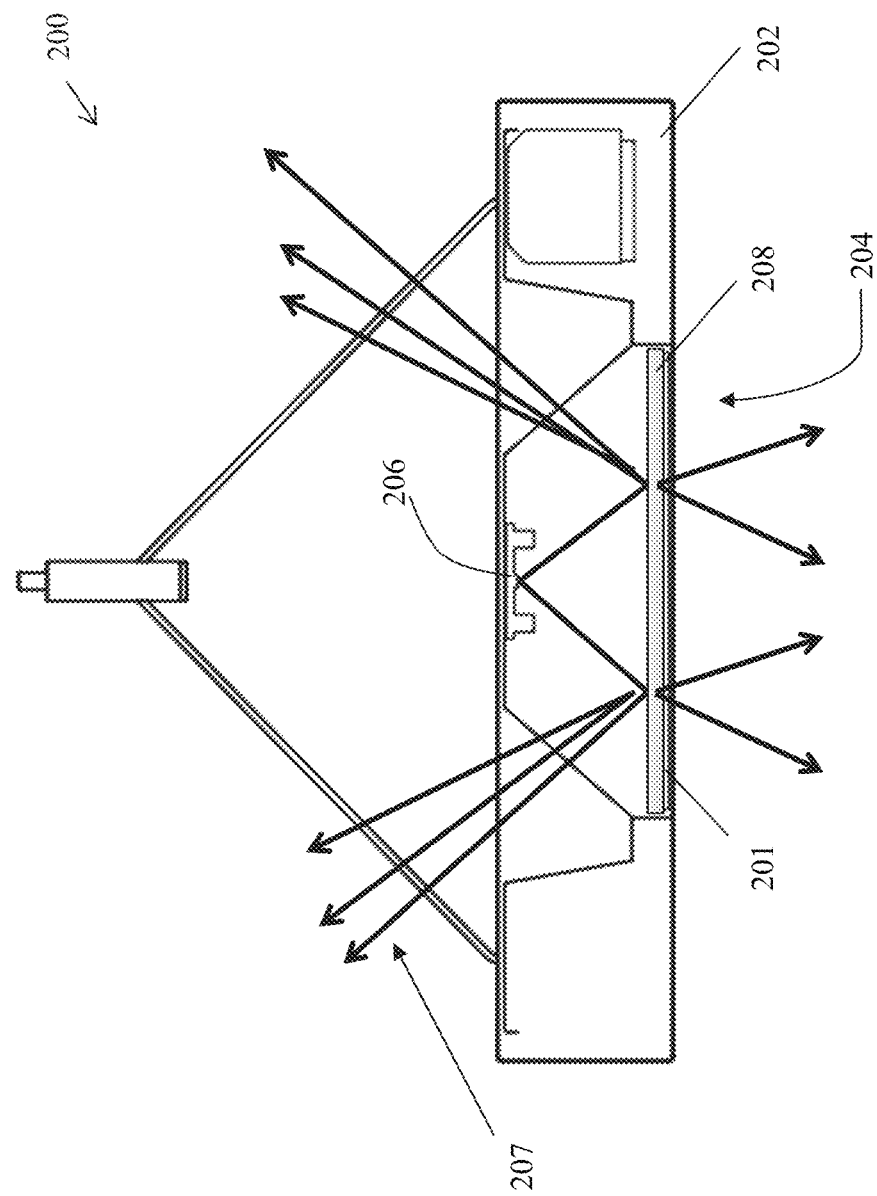

Referring to FIGS. 2-3, the luminaire 200 may include a housing 202 that is configured to house a lens 201 therein. The lens 201 may be a transparent lens and may have an electrochromic film 208 disposed thereon. In other example embodiments, the lens may be opaque or translucent. The lens 201 may be arranged in the housing 202 such that the lens 201 is disposed over and covers a light emitting opening 204 of the housing 202. Further, the housing 202 is configured to house a light source 206 therein such that the light source 206 is disposed below and spaced apart from the lens 201. The light source 206 may include one or more LEDs that face downward towards the lens 201 to emit light down towards the lens 201 and the light emitting opening 204. The electrochromic film 208 may be disposed on a major surface of the lens 201 that faces the light source 206. Similar to the example embodiment described above in connection with FIG. 1, the light source 206 and the electrochromic film reflector 208 may be controlled independently.

In the example embodiment illustrated in FIGS. 2-3, the electrochromic film 208 may be an opaque film in its default state, i.e., when power is not applied to the electrochromic film 208. The opacity of the electrochromic film 208 may be reduced when power is applied thereto. With the application of power to the electrochromic film 208, the opacity thereof may be changed from being fully opaque to being partially opaque and then fully transparent. As illustrated in FIG. 2, when the electrochromic film reflector 208 is opaque, i.e., when power is not applied to the electrochromic film 208, 100% uplight is gained. That is, as illustrated in FIG. 2 by the ray traces 207 of the light emitted by the light source 206, when the electrochromic film 208 is opaque, all the light emitted by the light source 206 may be reflected upwards by the electrochromic film 208 to create the 100% uplight. However, when power is applied and the electrochromic film 208 is partially opaque or transparent, a portion of the light emitted by the light source 206 may be reflected upwards while a remainder portion may pass through the lens 201 to be emitted as downlight through the light emitting opening 204 in the housing 202 as illustrated in FIG. 3. Using an electrochromic film 208 that is opaque in the default state allows the lens 201 on which the electrochromic film reflector 208 is disposed to be more prominent or noticeable when the light source 206 is switched off, which may be desirable in some scenarios (e.g., to conceal the light source and electrical components (wires, drivers, etc.)). Alternatively, the example embodiment illustrated in FIGS. 2-3 and be modified so that the electrochromic film 108 may be a transparent film in its default state, i.e., when power is not applied to the electrochromic film reflector 108; and the opacity thereof is increased when power is applied thereto.

Figure 4:
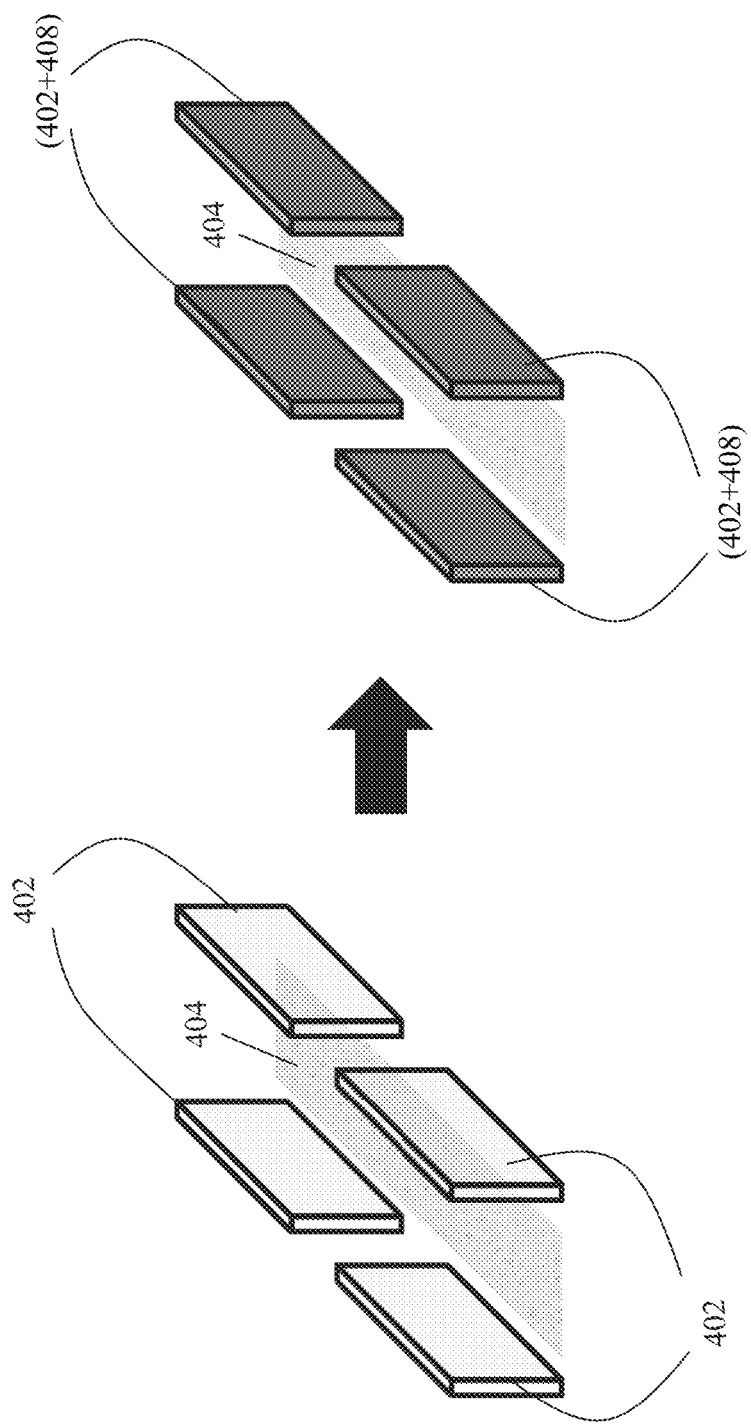
FIG. 4 illustrates yet another example luminaire with an electrochromic film reflector, where the luminaire is disposed along a pathway to guide a user along the pathway, in accordance with example embodiments of the present disclosure.

Referring to FIG. 4, this figure illustrates an example scenario or use case in which luminaires 402 are configured to illuminate the path 404 to guide a user in a desired direction. As illustrated in FIG. 4, the luminaires 402 may be disposed along the path 404 such that the light emitted by the luminaires 402 illuminates the path 404 and/or indicates a direction in which a user must proceed along the path 404. The luminaires 402 may include lightguide panel based luminaires, where the lightguide panel that is used in the luminaires 402 may be a transparent or a nearly transparent lightguide panel. In one example embodiment, the lightguide panel of the luminaires 402 may include an electrochromic film reflector disposed thereon, where the electrochromic film reflector may be a lighter color reflector. Alternatively, the lightguide panel of the luminaires 402 may not include an electrochromic film reflector that is disposed thereon. In either case, at night time when there is no daylight, the light emitted by the luminaires 402 through the lightguide panels thereof may clearly illuminate the path 404 and/or may indicate a direction in which a user should travel along the path 404. However, during daytime (e.g., on a sunny day), the light emitted from the lightguide panels of the luminaires 402 may be washed away by the daylight thereby making the luminaires 402 and the light emitted therefrom less visible. As illustrated in FIG. 4, the visibility of the luminaire 402 and/or the light emitted therefrom during the daytime may be increased by disposing a darker color electrochromic film 408 on the lightguide panels of each luminaire 402. For example, red, green, black, or blue electrochromic films may be disposed on the lightguide panels to make them more visible during the daytime. So, during the daytime, the darker electrochromic film 408 may make the luminaire more visible to indicate the path 404 and/or a direction that a user should travel along the path 404; and during the nighttime, the darker electrochromic film 408 may be made transparent such that light emitted from the luminaire 402 may pass through the lightguide panel and the electrochromic film 408 to illuminate the path 404.

An example of the scenario or use case illustrated in FIG. 4 may include a marathon where the streets are lined with the luminaires 402 having the darker electrochromic film 408 to indicate a path 404 and/or a direction in which the runners should run along the path 404 to reach a finishing point. Some of the luminaires 402 along some streets may have dark green electrochromic films 408 disposed thereon to indicate that the runners are going in the right direction, while some luminaires 402 along the other streets may have red electrochromic films 408 disposed thereon to indicate that the runners are going in the wrong direction. Further, during nighttime, the red and green electrochromic films may be made transparent such that light emitted from a light source may pass through the lightguide panel and the electrochromic films of the luminaires 402 to light the streets and/or the path 404.

In some example embodiments, the electrochromic films 408 may be transparent in a default state, i.e., when power is not applied thereto, and the electrochromic films 408 may transition to dark green or red color when power is applied thereto. So, in the example described above, during the day, power may be applied to the transparent electrochromic films to transition them to a dark green or red color. Alternatively, the electrochromic films 408 may have a dark color in the default state and may transition to being transparent when power is applied thereto. In other words, the electrochromic film 408 allows the luminaire 402 and the light emitted therefrom to be made more visible or less visible as desired, i.e., control a visibility of the luminaire 402 as desired.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A luminaire comprising:
a housing comprising a first light emitting opening and at least one second light emitting opening;
a light source that is disposed in the housing and configured to emit light in a first direction;
a lens that is disposed in the housing such that the lens is positioned below and spaced apart from the light source in the first direction, the lens covering the first light emitting opening; and
an electrochromic film disposed on a major surface of the lens, wherein the electrochromic film allows the light to pass through the first light emitting opening in the first direction at a first time; and
at a second time, the electrochromic film reflects the light in a second direction to pass through the at least one second light emitting opening.

2. The luminaire of claim 1, wherein the light source is at least one light emitting diode (LED), and wherein the at least one LED is facing the first direction.

3. The luminaire of claim 1, wherein the light source is coupled to a first power control device that is configured to control a light source electric power that is supplied to the light source, and wherein the electrochromic film is coupled to a second power control device that is configured to control an electrical power that is supplied to the electrochromic film.

4. The luminaire of claim 3, wherein the first power control device is controlled independently of the second power control device.

5. The luminaire of claim 3, wherein at least the second power control device is coupled to a controller device that is configured to wirelessly receive instructions to control the electrochromic film to adjust the amount of the light from the light source that passes through the lens.

6. The luminaire of claim 3, wherein at least the second power control device is coupled to a controller device that is configured to wirelessly receive instructions to control the electrochromic film to adjust the amount of the light from the light source that is directed to the second direction.

7. The luminaire of claim 1, wherein the electrochromic film is disposed on a major surface of the lens that faces the light source.

8. The luminaire of claim 1, wherein the electrochromic film is disposed on a major surface of the lens that faces away from the light source.

9. The luminaire of claim 1, wherein the luminaire is configured to be suspension mounted.

10. The luminaire of claim 1, wherein the electrochromic film is configured to adjust an amount of light passing through the lens when an amount of electrical power supplied to the electrochromic film is adjusted.

11. The luminaire of claim 1, wherein the electrochromic film is configured to transition between being opaque and being transparent when an amount of electrical power supplied to the electrochromic film is adjusted.

12. The luminaire of claim 1, wherein an opacity of the electrochromic film is adjustable when an amount of electrical power supplied to the electrochromic film is adjusted.

13. The luminaire of claim 1, wherein the electrochromic film is configured to transition between being colored and being transparent when an amount of electrical power supplied to the electrochromic film is adjusted.

14. The luminaire of claim 1, wherein the lens is a transparent lens.

15. The luminaire of claim 1, where the lens is translucent.

16. The luminaire of claim 1, wherein a light source power supplied to the light source is controlled independently of the electrical power supplied to the electrochromic film.

17. The luminaire of claim 1, wherein the light source and the electrochromic film are controlled such that:
a. when the light source is switched off, the electrochromic film is transparent; and
b. when the light source is switched on, the electrical power supplied to the electrochromic film is adjusted.

18. A luminaire comprising:
a housing comprising a first light emitting opening and at least one second light emitting opening;
a light source that is disposed in the housing and configured to emit light in a first direction, wherein such light includes a first portion and a second portion;
a lens that is disposed in the housing such that the lens is positioned below and spaced apart from the light source in the first direction, the lens covering the first light emitting opening; and
an electrochromic film disposed on a major surface of the lens, wherein the electrochromic film allows the first portion of the light to pass through the first light emitting opening in the first direction, and the electrochromic film reflects the second portion of the light in a second direction to pass through the at least one second light emitting opening; and the electrochromic film is configured to adjust an amount of light passing through the lens and an amount reflected to the second direction when the amount of electrical power supplied to the electrochromic film is adjusted.

19. The luminaire of claim 18, wherein the first portion of light passing through the first light emitting opening provides downlighting and wherein the second portion of light passing through the at least one second light emitting opening provides uplighting, and wherein the downlighting and uplighting are provided simultaneously.

20. The luminaire of claim 18, wherein the light source is coupled to a first power control device that is configured to control a light source electric power that is supplied to the light source, and wherein the electrochromic film is coupled to a second power control device that is configured to control the electrical power that is supplied to the electrochromic film.

\* \* \* \* \*